United States Patent
Choy et al.

(10) Patent No.: US 8,733,539 B2
(45) Date of Patent: May 27, 2014

(54) VIBRATORY FEEDER FOR CONVEYING COMPONENTS

(75) Inventors: Ping Kong Choy, Kwai Chung (HK); Chung Sheung Yung, Kwai Chung (HK); Ho Chi Wong, Kwai Chung (HK); Chung Yin Lau, Kwai Chung (HK)

(73) Assignee: ASM Technology Singapore Pte Ltd, Singapore (SG)

( * ) Notice: Subject to any disclaimer, the term of this patent is extended or adjusted under 35 U.S.C. 154(b) by 13 days.

(21) Appl. No.: 13/448,924

(22) Filed: Apr. 17, 2012

(65) Prior Publication Data

US 2013/0270070 A1    Oct. 17, 2013

(51) Int. Cl.
*B65G 27/24*    (2006.01)

(52) U.S. Cl.
USPC ........ 198/757; 198/553; 198/752.1; 198/759; 198/756

(58) Field of Classification Search
USPC .............. 198/391, 533, 752.1, 753, 756, 758, 198/759, 757, 766
See application file for complete search history.

(56) References Cited

U.S. PATENT DOCUMENTS

| | | | | |
|---|---|---|---|---|
| 3,917,050 A * | 11/1975 | Gregor | ......................... | 198/358 |
| 5,042,643 A * | 8/1991 | Akama | ......................... | 198/753 |
| 5,314,058 A * | 5/1994 | Graham | ......................... | 198/753 |
| 6,206,180 B1 | 3/2001 | Sekine et al. | | |
| 6,705,459 B1 | 3/2004 | Musschoot | | |
| 6,851,548 B1 * | 2/2005 | Dumbaugh | ................... | 198/770 |
| 6,948,611 B2 * | 9/2005 | Dumbaugh | ................... | 198/756 |
| 7,789,215 B1 * | 9/2010 | Snyder | ......................... | 198/391 |

* cited by examiner

*Primary Examiner* — Leslie A Nicholson, III
(74) *Attorney, Agent, or Firm* — Ostrolenk Faber LLP

(57) ABSTRACT

A vibration feeding apparatus comprises a receptacle for holding and conveying components, and first and second linear motors coupled to the receptacle. The first and second linear motors are spaced from each other and have respective coils that are aligned parallel to each other. The first and second linear motors are operative to be driven at a first operation mode whereby to impart rotary vibration to the receptacle, and at a second operation mode whereby to impart linear vibration to the receptacle.

11 Claims, 2 Drawing Sheets

VIBRATORY FEEDER FOR CONVEYING COMPONENTS

FIELD OF THE INVENTION

The invention relates to a feeding apparatus for transporting components, and in particular to a feeding apparatus which transports components using mechanical agitation.

BACKGROUND AND PRIOR ART

A vibratory feeding apparatus may comprise a container in the form of a rotary vibration bowl and a linear feeder in the form of a vibration track. They can be found in industry for conveying and orientating components, for instance electronic components, which are sorted from a pool of randomly oriented components during mass production. They are different from belt conveyers in that vibratory feeding apparatus use small vibrations to transfer components in a step-wise manner. Due to its simplicity and lack of moving mechanical parts, the vibratory feeding apparatus can provide a cleaner and more reliable way of conveying small components. Thus, there are large numbers of vibratory feeding apparatus developed for conveying small components in different industries.

A vibratory feeding apparatus generally involves four main mechanical modules: a bowl or track for orientation and sorting, a hopper for refilling the bowl or track, linear and/or rotary vibrator modules for exciting the bowl, track and/or hopper to vibrate, and a platform for vibration isolation.

The linear or rotary vibrator module generally excites the bowl or track to undergo vibration with a single frequency. The vibrator module comprises a movable block that transmits vibration to the bowl or track, an actuator that provides excitation forces to the movable block, and a spring-mass system that determines the vibration frequency of the vibrator and the conveyance direction. The vibrator module traditionally uses an electromagnetic solenoid, such that the force-displacement relationship of the vibrator module is non-linear in nature. The force from the solenoid accelerates the bowl or track to vibrate and the components placed on the bowl or track experience acceleration. The resultant acceleration has both vertical and horizontal components. When the vertical acceleration field is slightly larger than the gravitational field, the components are lifted off the bowl or track surface and are projected forward due to the horizontal acceleration component.

U.S. Pat. No. 6,206,180 entitled "Vibratory Parts Feeder" discloses a vibratory feeding apparatus which uses two sets of electromagnetic coils to generate vibration in vertical and horizontal directions respectively to create vibratory motion for a bowl feeder. An elliptical motion stroke is employed by changing the current phases of its motors in order to achieve a higher feeding speed.

U.S. Pat. No. 6,705,459 entitled "Two-Way Vibratory Feeder" discloses two-way vibratory feeding utilizing motor exciters. The bidirectional mechanism is constructed with different operational resonant frequencies. It can control the components on the surface of the feeder to move back and forth along X and Y axes on a horizontal plane independently.

Generally, since solenoids are used as electromagnetic actuators and the force-displacement characteristic of a solenoid is non-linear, the force input to the vibrator module thus varies with both the driving current and the displacement. Driving of the solenoid using a sine wave signal source also introduces a non-linear force which contains many different frequency components other than the desired excitation frequency to the vibrator module. Undesirable frequency components will cause unwanted motion of the components being transferred using the vibrator module. It may also generate noise from abrupt changes in the driving signal source.

Another vibrator module uses a square waveform as the driving signal source. Apart from the multiple frequency components generated by the vibrator module, the vibrator module also generates noise as a result of abrupt changes in force inherent in a square waveform. It is thus preferable to develop a vibrator module with linear driving actuators so that the vibrator module can vibrate in a purer single frequency.

Certain state of the art vibrator modules use flexible piezoelectric elements as actuators, which provide linear forces to the vibrator module. The flexible piezoelectric elements are formed by bonding piezoelectric ceramic on a metallic or fiber-based composite substrate. As piezoelectric elements are compact and light, bowl or track designs using them are usually tidier and lighter. This also makes vibrator modules using piezoelectric elements more compact and much more space can be reserved for other functional modules. Moreover, the piezoelectric element is usually integrated to the spring of the vibrator module, and this makes the mass of the moving part of the vibrator module lighter and vibrator modules using piezoelectric elements can run at high frequencies.

However, since piezoelectric elements are made from the bonding of a piezoelectric ceramic on a metallic or fiber-based composite substrate, possible delamination may occur after repeated cyclic motion. Reliability of the piezoelectric element is thus a major problem for the vibratory feeding apparatus when it is operated in heavy volume production. It is thus advantageous to use a more robust actuation means that can operate in harsh conditions. Also, the cost of piezoelectric elements is usually higher than for solenoids.

Apart from nonlinear forces and lack of reliability of prior art vibration actuators, the designs of vibrator modules are usually limited to only linear or rotary agitation. Since there are many different vibratory feeder applications in the field, it is better to have a vibrator design which can easily switched between linear and rotary agitation. Also, this can help to standardize the parts required in inventory and make on-site maintenance easier. Where there are two separate systems produced respectively for generating rotary and linear motions, the two systems must be well-isolated so as not to adversely affect the respective motions. Further, there is a risk of jamming between the two systems when the two systems separately vibrate.

In view of the above mentioned shortcomings, it would be advantageous to design a vibrator which utilizes a linear actuator. Moreover, it is better to make the design common for both linear and rotary vibrators.

SUMMARY OF THE INVENTION

Thus, the invention seeks to provide a vibration feeding apparatus that receives a linear force from its actuator, and which linear force can be switched between rotary and linear actuation, so as to avoid some of the aforesaid shortcomings of the prior art.

Accordingly, the invention provides a vibration feeding apparatus comprising: a receptacle for holding and conveying components; first and second linear motors coupled to the receptacle, the first and second linear motors being spaced from each other and having respective coils that are aligned parallel to each other; wherein the first and second linear motors are operative to be driven at a first operation mode whereby to impart rotary vibration to the receptacle, and at a second operation mode whereby to impart linear vibration to the receptacle.

It would be convenient hereinafter to describe the invention in greater detail by reference to the accompanying drawings which illustrate one preferred embodiment of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of the preferred embodiment of the invention when considered with the accompanying drawings, in which.

DETAILED DESCRIPTION OF THE PREFERRED EMBODIMENT OF THE INVENTION

Figure 1:
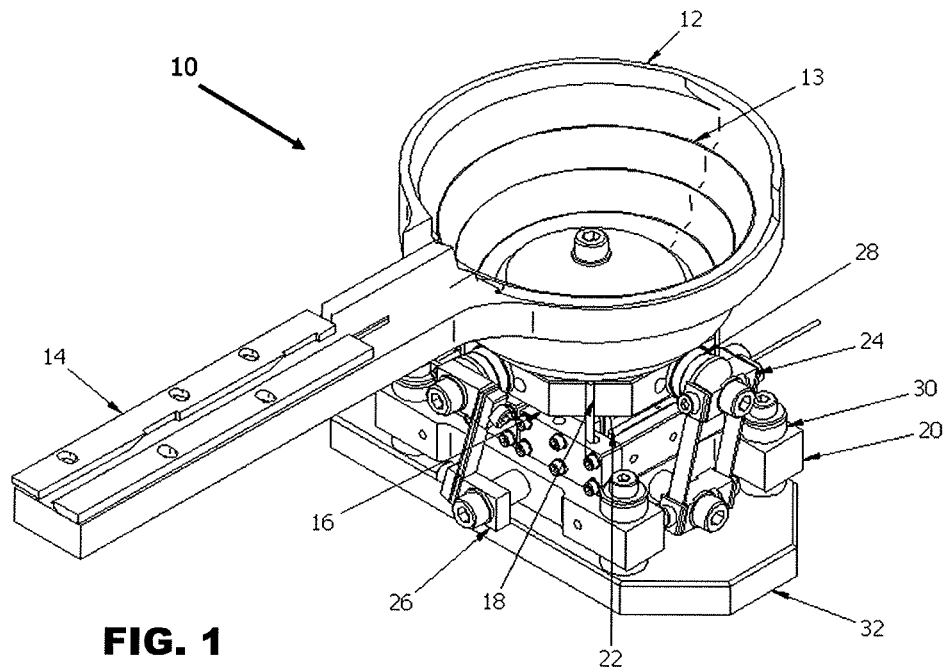
FIG. 1 is an isometric view of the vibration feeding apparatus according to the preferred embodiment of the invention.

FIG. 1 is an isometric view of the vibration feeding apparatus 10 according to the preferred embodiment of the invention.

This vibration feeding apparatus 10 includes a receptacle for holding and conveying components, which may comprise a vibration feeding bowl 12 having an internal spiral track 13 and a linear vibration feeding track 14. It uses first and second linear motors 22a, 22b, such as voice coil motors, as actuators for driving the apparatus 10. The vibration feeding apparatus 10 generally comprises the following major parts, namely: a vibrator top plate 16, springs 24, 26, linear motors 22a, 22b and a vibration isolation base 20. In order to make the total height profile as low as possible, the first and second linear motors 22a, 22b are located and sandwiched between the vibrator top plate 16 and the vibration isolation base 20. The first and second linear motors 22a, 22b are spaced from each other and respective coils 21a, 21b of the linear motors 22a, 22b are aligned parallel to each other under the vibrator top plate 16.

The vibrator top plate 16 supports the vibration feeding bowl 12 and linear vibration feeding track 14, and in turn is suspended above the vibration isolation base 20 by flexible structural rods 18 to form a motion stage that can have flexible movement in both horizontal and rotational directions with reference to the vibration isolation base 20. The two linear motors 22a, 22b (see FIG. 2) installed between the vibrator top plate 16 and vibration isolation base 20 are actuable to generate forces driving the vibrator top plate 16 to oscillate as the linear motors 22a, 22b are driven by sinusoidal current inputs provided by a current generator.

The first and second linear motors 22a, 22b are operative to be driven at a first operation mode to convey components along the spiral track 13 of the vibration feeding bowl 12, and at a second operation mode to impart linear vibration to convey components along the linear vibration track 14. When the linear motors 22a, 22b are connected and driven with opposite polarities in opposite directions, the vibrator top plate 16 will oscillate with a rotary motion when the linear motors 22a, 22b create torque to drive the vibrator top plate 16 in rotary directions in the first operation mode. The vibrator top plate 16 will instead oscillate with horizontal linear motions when both linear motors 22a, 22b are connected and driven at the same polarity in the same directions in the second operation mode.

Figure 2:
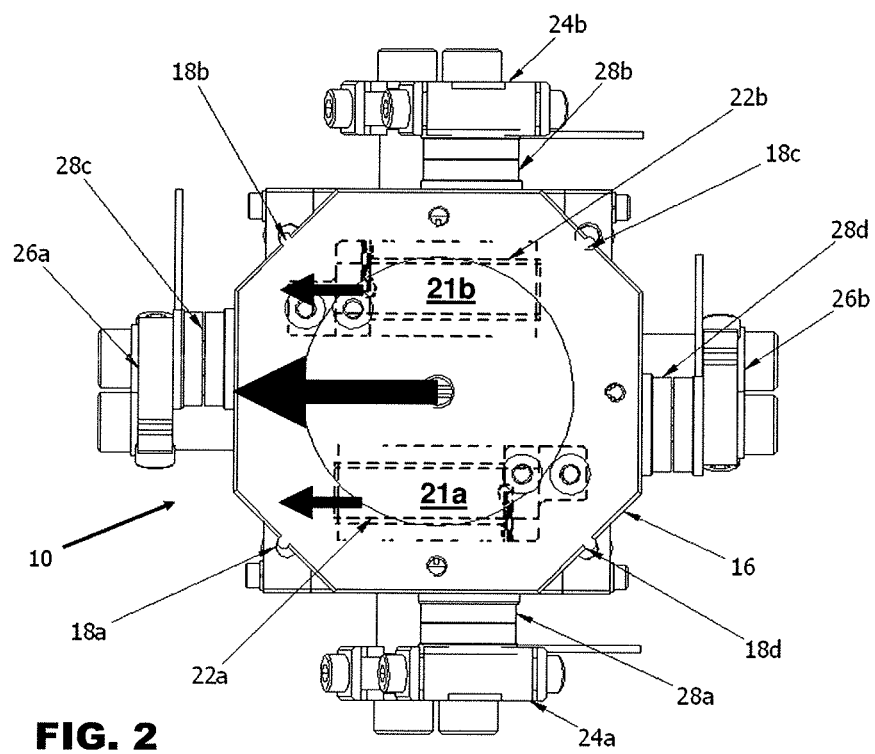
FIG. 2 is a plan view of the vibration feeding apparatus of FIG. 1 during its linear vibration mode.

FIG. 2 is a plan view of the vibration feeding apparatus 10 of FIG. 1 during its linear vibration mode. The vibrator top plate 16 is further suspended by at least one pair, and most preferably two pairs of flexible structural springs connecting the vibration top plate 16 to the vibration isolation base 20, as shown in FIG. 2. These are a pair of linear feeding springs 24a, 24b and a pair of rotary feeding springs 26a, 26b. These springs engage to the vibration top plate 16 by energizing two corresponding pairs of electromagnetic clutches 28a-d, each electromagnetic clutch 26a-d being coupled to each spring 22a, 24b, 26a, 26b.

The four linear and rotary feeding springs 24a, 24b, 26a, 26b are evenly distributed on four sides of the vibrator top plate 16 and the rotary feeding springs 26a, 26b are functional to guide rotary vibration of the receptacle when the vibrator top plate 16 is operated in rotary vibration mode. In linear vibration mode, the two linear feeding springs 24a, 24b mounted on opposite sides of the vibrator top plate 16 are functional to guide linear vibration of the receptacle. One end of each of the four springs 24a, 24b, 26a, 26b is connected to the vibrator top plate 16 such that the four springs 24a, 24b, 26a, 26b are inclined at angles of about 5°-20° with respect to the bottom surface of the vibration isolation base 20. For the linear vibration mode, the linear spring 24a is inclined parallel to linear spring 24b. For the rotary vibration mode, the rotary spring 26a is inclined in an opposite direction to rotary spring 26b.

Figure 3:
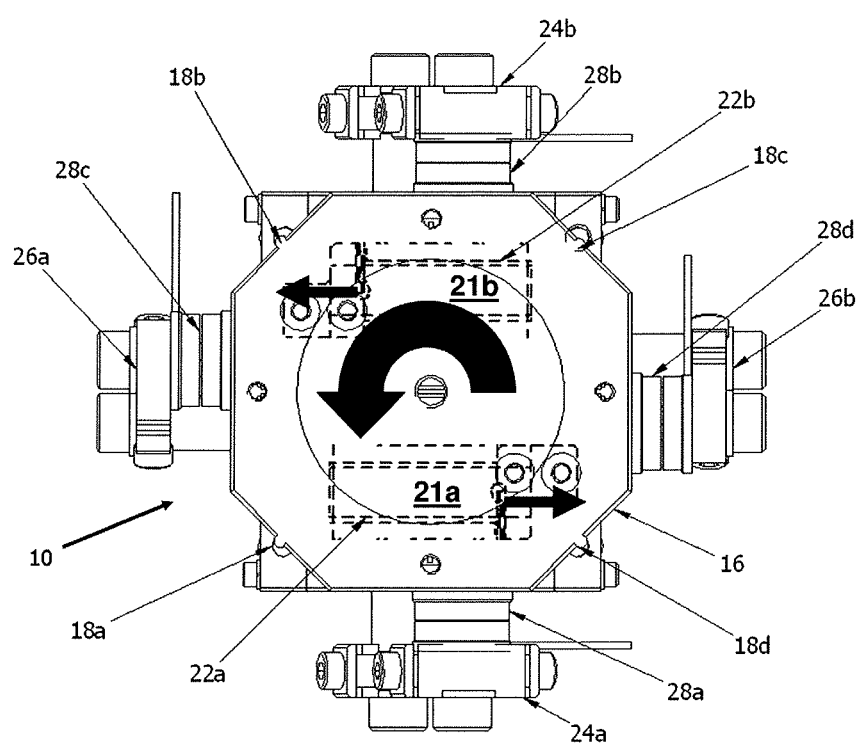
FIG. 3 is a plan view of the vibration feeding apparatus of FIG. 1 during its rotary vibration mode.

FIG. 3 is a plan view of the vibration feeding apparatus 10 of FIG. 1 during its rotary vibration mode. The motion directions of the vibrator top plate 16 follow the vibration mode shape of the flexible structural rods 18a, 18b, 18c, 18d when the electromagnetic clutches 28c, 28d engage their corresponding spring pairs 26a, 26b during actuation. In rotary vibrator mode, the springs are inclined so that they are axisymmetric to the central axis of the vibration top plate 16. The vibrator top plate 16 begins to rotate when there is a reverse polarity motor connection between the linear motors 22a, 22b as shown in FIG. 3 and the rotary feeding springs 26a, 26b and electromagnetic clutches 28c, 28d are energized. The components will be conveyed upwards inside the spiral track 13 of the vibration feeding bowl 12.

When the components reach the linear vibration feeding track 14 the linear motors 22a, 22b are switched to the same polarity and engage the linear feeding spring pair 24a, 24b to generate linear motion of the linear vibration feeding track 14 and the components conveyed on them. The components will therefore feed towards a linear track outlet at an opposite end of the linear vibration feeding track 14 from the vibration feeding bowl 12.

Since the assembly of the vibrator top plate 16, vibration isolation base 20, linear motors 22, and springs 24, 26 create vibration during operation, the aforesaid assembly is mounted on the isolated base 32 to reduce unwanted vibration transmission from the vibration feeding apparatus 10 to the surroundings. Further, rubber isolators 30 are mounted on the top and bottom of the vibration isolation base 20 in order to reduce vibrations that are transmitted to the isolated base 32.

During operation, the linear motors 22 are actuated so that the vibrator top plate 16 oscillates bidirectionally within the constraints set by the springs 24a-b, 26a-b. In order to make the amplitude of vibration of the movable top plate as large as possible, the vibration feeding apparatus 10 is operated at its resonant frequency in use. The resonant frequency is determinable by the stiffness of the springs 24a-b, 26a-b and also the inertia of the vibrator top plate 16, bowl 12, track 14 and linear motors 22a, 22b.

It should be appreciated that the vibration feeding apparatus 10 according to the preferred embodiment of the invention adopts a linear motor-driven vibrator where the excitation force is independent of displacement. The force exerted on the vibration feeding bowl 12 or linear vibration feeding track 14 thus contains fewer frequency components other than the desired frequency. Hence, the apparatus generates less harmonic vibration so the track 14 and bowl 12 vibrate less along the undesired directions as compared to using a conventional solenoid-type actuator.

The vibration feeding apparatus 10 as described can provide both linear and rotary vibratory motions for conveying components utilizing a single vibratory system, whereas conventional approaches require two or more separate vibratory systems in order to achieve both linear and rotary motions.

The vibration feeding apparatus 10 may share common inventory for linear and rotary vibration feeding applications. The design locates two pairs of flexural springs at the outermost rim of the vibrator for changing from linear to rotary vibration direction or vice versa. The vibration feeding mechanism, which comprises the rotary feeding bowl 12 and the linear feeding track 14, is designed according to those vibration directions. Such an arrangement allows components to be conveyed from the vibration feeding bowl 12 and linear vibration feeding track 14 to an outlet in a single row format.

The invention described herein is susceptible to variations, modifications and/or additions other than those specifically described and it is to be understood that the invention includes all such variations, modifications and/or additions which fall within the spirit and scope of the above description.

The invention claimed is:

1. A vibration feeding apparatus comprising:
   a receptacle for holding and conveying components;
   first and second linear motors coupled to the receptacle, the first and second linear motors being spaced from each other and comprising respective coils that are aligned parallel to each other,
   wherein the first and second linear motors are operative to be driven at a first operation mode whereby to impart rotary vibration to the receptacle, and at a second operation mode whereby to impart linear vibration to the receptacle;
   a vibratory top plate for supporting the receptacle and a vibration isolation base,
   wherein the linear motors are located between the vibration top plate and the vibration isolation base;
   at least one pair of structural springs connecting the vibrator top plate to the vibration isolation base,
   wherein the structural springs guide the rotary and/or linear vibration of the receptacle; and
   an electromagnetic clutch coupled to each structural spring, the electromagnetic clutch being configured to engage the structural spring to the vibration top plate when it is actuated.

2. The vibration feeding apparatus as claimed in claim 1, wherein the first and second linear motors are driven in the same polarity in the first operation mode, and the first and second linear motors are driven in opposite polarities in the second operation mode.

3. The vibration feeding apparatus as claimed in claim 1, further comprising a current generator configured for providing sinusoidal current inputs for driving the first and second linear motors.

4. The vibration feeding apparatus as claimed in claim 1, wherein the receptacle comprises a linear vibration feeding track and a bowl having an internal spiral track for conveying components.

5. The vibration feeding apparatus as claimed in claim 4, wherein rotary vibration of the receptacle is operative to convey components along the spiral track of the bowl and linear vibration is operative to convey components along the vibration feeding track.

6. The vibration feeding apparatus as claimed in claim 1, wherein the vibrator top plate is suspended above the vibration isolation base by flexible structural rods such that the vibrator top plate forms a flexible motion stage.

7. The vibration feeding apparatus as claimed in claim 1, wherein the vibration feeding apparatus is operated at its resonant frequency in use.

8. A vibration feeding apparatus comprising:
   a receptacle for holding and conveying components;
   first and second linear motors coupled to the receptacle, the first and second linear motors being spaced from each other and comprising respective coils that are aligned parallel to each other,
   wherein the first and second linear motors are operative to be driven at a first operation mode whereby to impart rotary vibration to the receptacle, and at a second operation mode whereby to impart linear vibration to the receptacle;
   a vibratory top plate for supporting the receptacle and a vibration isolation base,
   wherein the linear motors are located between the vibration top plate and the vibration isolation base;
   two pairs of structural springs to connect the vibrator top plate to the vibration isolation base, one pair of structural springs being configured to guide rotary vibration of the receptacle and another pair of structural springs is configured to guide linear vibration of the receptacle,
   wherein the pair of structural springs configured to guide linear vibration are inclined parallel to each other whereas the pair of structural springs configured to guide rotary vibration are inclined in opposite directions to each other.

9. The vibration feeding apparatus as claimed in claim 8, wherein the two pairs of structural springs are evenly distributed on four sides of the vibration top plate.

10. The vibration feeding apparatus as claimed in claim 8, wherein each structural spring is inclined at an angle of 5°-20° with respect to the bottom surface of the vibration isolation base.

11. A vibration feeding apparatus comprising:
    a receptacle for holding and conveying components;
    first and second linear motors coupled to the receptacle, the first and second linear motors being spaced from each other and comprising respective coils that are aligned parallel to each other,
    wherein the first and second linear motors are operative to be driven at a first operation mode whereby to impart rotary vibration to the receptacle, and at a second operation mode whereby to impart linear vibration to the receptacle;
    a vibratory top plate for supporting the receptacle and a vibration isolation base,
    wherein the linear motors are located between the vibration top plate and the vibration isolation base;
    an isolated base on which the vibrator top plate, first and second linear motors and vibration isolator base are mounted to prevent unwanted vibration transmission to the surroundings; and rubber isolators mounted on top and bottom surfaces of the vibration isolation base to reduce vibrations that are transmitted to the isolated base.

* * * * *